United States Patent [19] [11] 4,445,712

Smagala-Romanoff [45] May 1, 1984

[54] IDENTIFICATION DEVICES AND METHODS

[75] Inventor: Edward A. Smagala-Romanoff, Palm Springs, Calif.

[73] Assignee: ID Code Industries, Inc., Palm Springs, Calif.

[21] Appl. No.: 392,297

[22] Filed: Jun. 25, 1982

Related U.S. Application Data

[63] Continuation of Ser. No. 111,908, Jan. 14, 1980, abandoned.

[51] Int. Cl.³ ...................... B42D 15/00; G06K 19/06

[52] U.S. Cl. ...................................... 283/75; 235/493; 235/494

[58] Field of Search ................... 283/7, 11, 58, 70–76; 235/493, 494

[56] References Cited

U.S. PATENT DOCUMENTS

| | | | |
|---|---|---|---|
| 478,294 | 7/1892 | Spivey | 283/11 |
| 1,136,876 | 4/1915 | Hebern | 283/11 |
| 1,219,634 | 3/1917 | Fisher | 283/11 |
| 1,556,895 | 10/1925 | Ayers | 283/7 |
| 1,813,257 | 7/1931 | Rand, Jr. | 283/7 |
| 2,298,487 | 10/1942 | Kiner | 179/2 CA |
| 3,609,690 | 9/1971 | Nissman | 340/149 R |
| 3,665,162 | 5/1972 | Yamamoto | 235/61.7 B |
| 3,718,349 | 2/1973 | Small | 283/17 |
| 3,719,801 | 3/1973 | Drexler | 235/61.12 N |
| 3,794,813 | 2/1974 | Spetz | 235/61.7 B |
| 4,184,148 | 1/1980 | Smagala-Romanoff | 283/7 X |

FOREIGN PATENT DOCUMENTS 695673 10/1964 Canada .

OTHER PUBLICATIONS

IBM Technical Disclosure Bulletin, vol. 13, Dec. 1970.

*Primary Examiner*—Frank T. Yost
*Assistant Examiner*—John S. Brown
*Attorney, Agent, or Firm*—Maurice R. Boiteau

[57] ABSTRACT

There are disclosed in the present application, devices and methods for providing identification of a client by his ability to select a correct set of digits from a multiplicity of them on any one of a plurality of grids each with a different order and arrangement of digits on a suitable surface. The client easily establishes his identity by selecting the correct digits from any randomly selected grid at the subscriber location by obtaining in advance, a password from which he determines the correct digits by their positions in all the grids. The accuracy of the client's answer is checked against a register listing, for each client, an independent identification number, and his password. The register also contains a list of correct digits or codes and the grid number for which each code is the appropriate answer. In addition, the present devices and methods may be used for identifying clients for check cashing and for this purpose, the grid may be displayed on the reverse side of a check and the grid identified in the register by check number.

7 Claims, 6 Drawing Figures

Fig. 4
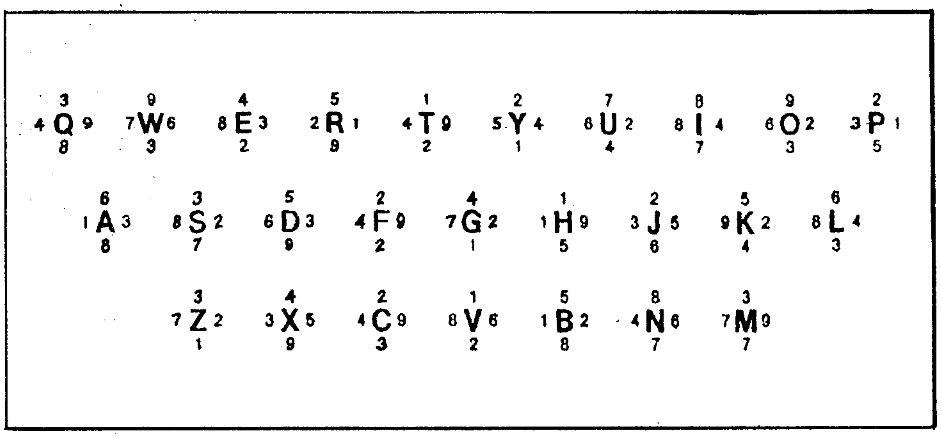
Fig. 5
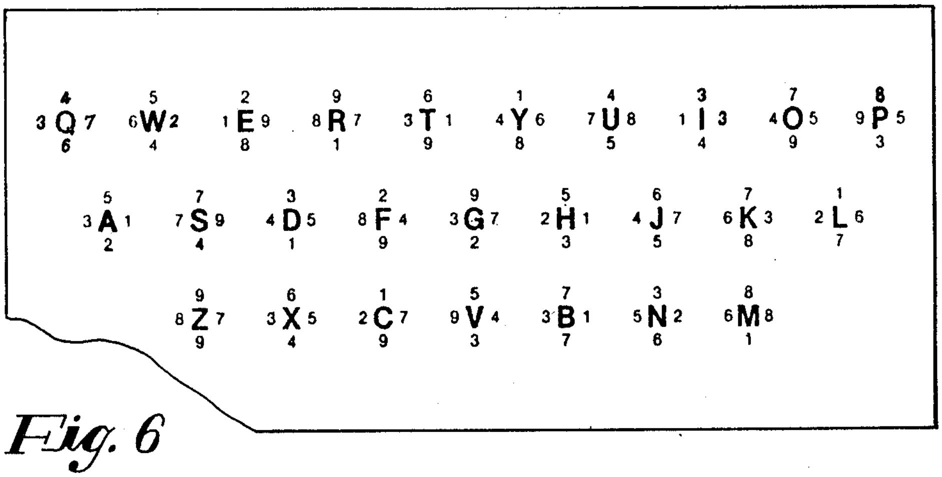
Fig. 6
| INDEPENDENT IDENTIFICATION | PASS-WORD | GRID OR CHECK NO. | CODE |
|---|---|---|---|
| 035-12-6983 | HOME UP | 3984 | 1934 |
| 035-12-6983 | HOME UP | 4763 | 5782 |
| 035-12-6983 | HOME UP | 277 | 6178 |
| 035-12-6983 | HOME UP | 278 | 7544 |
| 035-12-6984 | JOHN DN | 3984 | 4742 |
| 035-12-6984 | JOHN DN | 4763 | 4212 |
| 035-12-6984 | JOHN DN | 277 | 6357 |
| 035-12-6984 | JOHN DN | 278 | 6936 |

IDENTIFICATION DEVICES AND METHODS

This application is a continuation, of application Ser. No. 111,908, filed Jan. 14, 1980 and now abandoned.

The present invention relates generally to improvements in devices and methods for the personal identification of a client at a subscriber location, but more particularly, it relates in one respect to improvements in personal identification methods practiced without use of cards or other devices which must be carried by the client and are thus subject to loss, theft or compromise.

In some respects, the present invention, may be considered as a continuation in part of my co-pending application for United States Letters Patent Ser. No. 762,299 filed Jan. 25, 1977, now U.S. Pat. No. 4,184,148.

In the co-pending application, there are disclosed identification devices and methods which include simple grids and the concept of personal identification by means of positional codes to determine the correct digits for proving identity in response to the presentation to the client of any of a plurality of like grids. The devices and methods of the application, however, have suffered from two principal shortcomings. One of these is that in order to avoid making the grid excessively complex, it has been necessary that their size in terms of the number of digits, which they contain, be limited. The result is that there is a remote possibility, however slight, that a client's positional code might be discovered by a trial and error process carried out over a lengthy and tedious period of time by a determined impostor. A more important problem is the difficulty which clients have experienced in remembering their positional codes. Even though the application proposes an overlay of an object to aid the client's memory, there has generally been a tendency to forget.

It is accordingly an object of the present invention to improve the security of identification devices and methods.

At the same time while the security is being improved, it is a further object to assist the client to remember the positional codes which will establish his identity.

In the achievement of the foregoing objects, a feature of the invention relates to a new form of grid in which numerals are arranged in a pattern around letters of the alphabet which establish the positions. The letters may be arranged either alphabetically or alternatively in the pattern employed in a typewriter keyboard with which many clients are already familiar.

Another feature relates to a check form in which a grid is displayed on the back of the check and may be used for the purpose of identifying the maker of the check who would have his check cashed in a location where he is not personally known. Identification of the maker may be readily established by receiving from him an independent identification number together with the check number and four identifying digits. The identity may then be verified by telephoning a central bureau and communicating the information received from the potential check casher, to be verified against a register.

The foregoing objects and features, together with numerous advantages to be derived from the invention will be more fully understood and appreciated from the following detailed description of illustrative embodiments taken in connection with the accompanying drawings in which:

FIG. 4 is a view depicting a grid format appearing on the back of the check of FIG. 3 and an arrangement of letters different from the grids depicted in FIGS. 1 and 2;

FIG. 5 is an alternative grid arrangement similar to FIG. 4 but including different digits; and FIG. 6 is a fragmentary view depicting a form of register used in the practice of the present invention.

Figure 1:
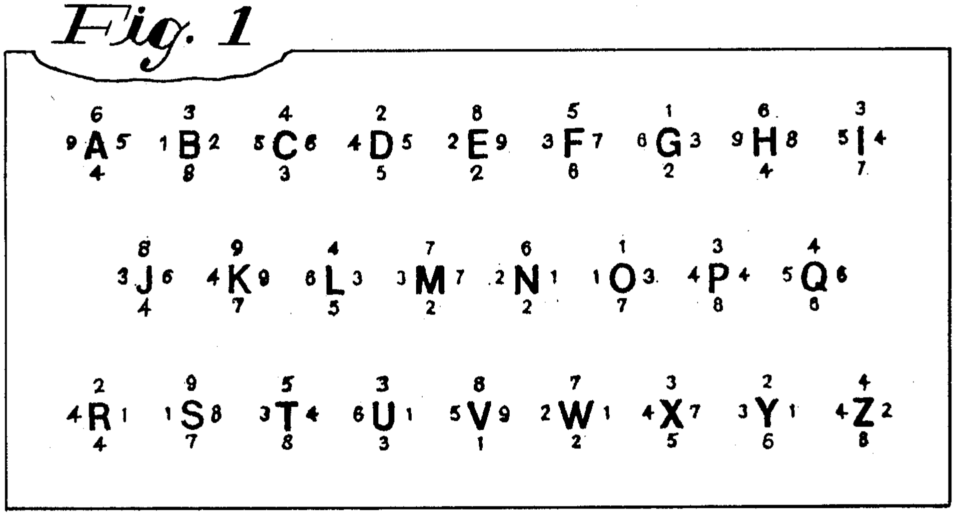
FIGS. 1 and 2 are drawings of alternative grid formats employed in the practice of the present identification methods.
Figure 2:
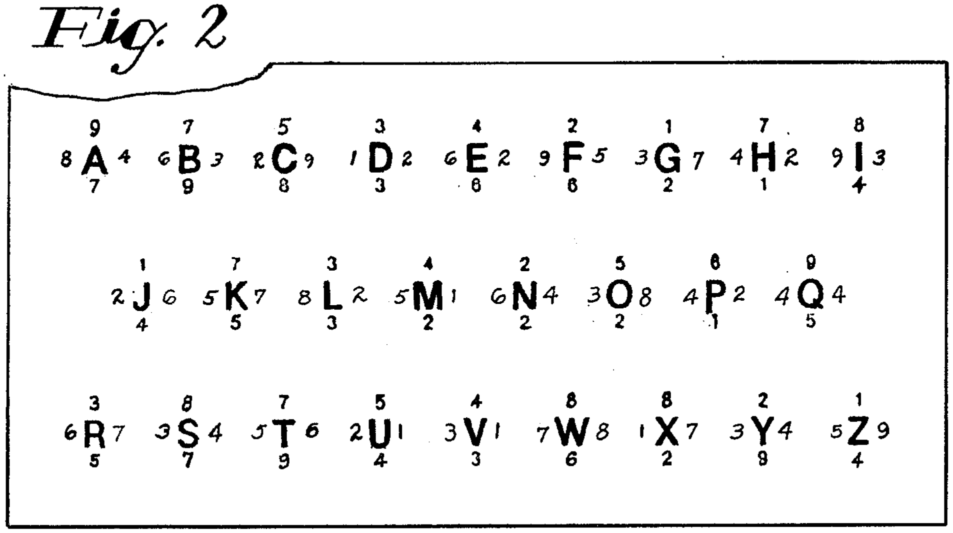

Turning now to the drawings, particularly FIGS. 1 and 2, there are shown grids including letters arranged in three rows and in alphabetical order. Arranged in a pattern around each letter of the alphabet are four digits above, to the right, below and to the left of each letter. For purposes of simplicity, the location of any digit relating to a letter is given as UP, DN for down, R for right and L for left. Thus, as seen in FIG. 1 A-UP is 6, A-DN is 4, A-R is 5 and A-L is 9.

Figure 3:
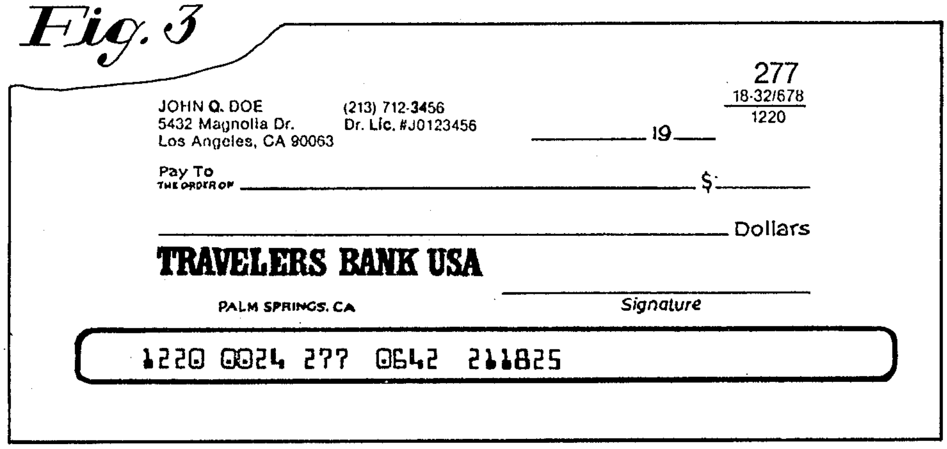
FIG. 3 is a drawing depicting the front face of a check intended to be used in conjunction with the identification methods of the present invention.

For remembering his positional code, a client may be given the word HOME UP and this would also be entered in the register as seen in FIG. 6. When the client whose identification independently provided could be 035-12-6983 is presented at a subscriber location with the grid depicted in FIG. 1, numbered 6549 after the digits surrounding the letter in the upper left hand corner of the grid, the A, his response is 6178. On the other hand if presented with the grid depicted in FIG. 2 similarly numbered for 9478 his answer should be 7544. If the same client intends to cash a check no. 277, (as shown in FIG. 3), he will refer to the grid format on the reverse side of the check No. 277 as shown in FIG. 4, in which the letters are arranged in the order found on a typewriter keyboard, and the client's answer should be 1934. If the check to be cashed had the grid depicted in FIG. 5, that on the back of check number 278, his answer should be 5782. If a second client having an independent identification of 035-12-6984 and the password JOHN DN his answer when presented with grid number 6549 of FIG. 1, should be 4742 while his answer when presented with grid number 9478 of FIG. 2, should be 4212. If the second client should wish to cash check 277, he would refer to the grid appearing on the back of this check and depicted in FIG. 4 and give the answer 6357, but if the check were number 278, he would refer to the grid in FIG. 5, which is printed on the back of that check and give the answer 5936.

From an inspection of FIGS. 1 and 2, for example, it is obvious that all twenty-six letters of the alphabet are displayed in each grid and that some or all of the digits from 0 to 9 are correlated in each direction around the letters. Thus, assuming that all the letters and all the digits are used in each direction in each grid, a predetermined ratio is thereby established. Accordingly, considering only the down direction, for example, the digits are repeated several times on average in each direction of each grid, this repetition rate, which increases the difficulty of deciphering a client's code by an outsider, is subject to being reduced if some letters are eliminated and increased if some digits are not used.

Having thus disclosed my invention, what I claim as new and desire to secure by Letters Patent of the United States is:

1. A method of establishing the identity of an unknown client at a subscriber location comprising the steps of:

first, providing the client with a personal positional code consisting of a sequence of a plurality of letters of the alphabet, each of which locates a digit of a multi-digit number establishing the identity of the client;

thereafter, at a subscriber location, presenting the client one of a multiplicity of different grids of digits in which each digit is positionally associated with a letter of the alphabet;

obtaining a first response providing a pre-determined form of identification from the client;

receiving from the client a second response consisting of a multi digit number from the grid as derived from his previously obtained personal positional code; and verifying the identity of the client by comparing the identification and number obtained from the client against a register.

2. A method according to claim 1 further characterized in that each grid selectively presentable to the client at the subscriber location includes substantially all the letters of the alphabet and that there is positioned in a common pattern around and in close proximity to each letter a plurality of different digits.

3. A set of devices for establishing the identity of an unknown client to a representative at a subscriber location comprising a multiplicity of different grids adapted to be presented to any client in accordance with the choice of the representative and each including at least a majority of letters of the alphabet each defining a position common to all grids of the multiplicity of grids in which the same letter occupies the same position in all grids, and at least one random digit closely associated by proximity to each letter, the ratio of letters to digits being such that at least some of the digits are repeated and associated with different letters in the same grid, and also including means for identifying the grid and a register showing, for each client, an independent identification and a combination of digits which, when given correctly by the client to the representative in response to having viewed any grid at the subscriber location, verify his identity.

4. Devices according to claim 3 further characterized in that substantially all the letters of the alphabet appear on each grid and that each letter is surrounded in close proximity by a common pattern of digits each having a predetermined direction relative to the letter with which it is associated.

5. Devices according to claim 3 further characterized in that substantially all the letters of the alphabet appear on each grid and that each letter is surrounded in close proximity by a set of four digits arranged in a common positional pattern wherein the digits of each set associated with any given letter are different from one grid to another.

6. A method of establishing the identity of an unknown client at a subscriber location comprising the steps of:

first, providing the client with a positional code establishing for the client a sequence of a plurality of successive positions each marked by a letter and one of a plurality of orientations surrounding the letter, in each of which a digit of a multi-digit number establishing his identity is located;

thereafter, at a subscriber location, presenting the client one of a multiplicity of different grids of letters of the alphabet in which each said letter is in close proximity to and is surrounded by a plurality of numbers, each said number having a specific reference orientation with said letter;

obtaining a first response from the client which includes a pre-determined identification code;

receiving from the client a second response consisting of a plurality of digits from the grid as derived from the pre-determined identification code; and verifying the identity of the client by comparing the identification and digits obtained from the client against a register.

7. Devices for establishing the identity of an unknown client at a subscriber location comprising a multiplicity of different grids each including substantially all the letters of the alphabet, each letter being surrounded in close proximity by a set of four digits arranged in a common positional pattern wherein the digits of each set associated with any given letter are different from one grid to another, and a register showing, for each client, an independent identification and a combination of digits which, when given correctly by the client at the subscriber location, verify his identity.

* * * * *